(12) United States Patent
Ansari et al.

(10) Patent No.: US 10,715,882 B2
(45) Date of Patent: Jul. 14, 2020

(54) TIMING SYNCHRONIZATION BETWEEN A CONTENT SOURCE AND A DISPLAY PANEL

(71) Applicant: Intel Corporation, Santa Clara, CA (US)

(72) Inventors: Nausheen Ansari, Folsom, CA (US); Gary K. Smith, El Dorado Hills, CA (US); Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 16/024,432

(22) Filed: Jun. 29, 2018

(65) Prior Publication Data

US 2019/0045278 A1 Feb. 7, 2019

(51) Int. Cl.
```
H04N 21/8547   (2011.01)
H04N 21/43     (2011.01)
G09G 3/36      (2006.01)
G09G 3/20      (2006.01)
G09G 5/12      (2006.01)
G06F 3/14      (2006.01)
G09G 5/00      (2006.01)
```
(52) U.S. Cl.
CPC ....... *H04N 21/8547* (2013.01); *G06F 3/1446* (2013.01); *G09G 3/2096* (2013.01); *G09G 3/3618* (2013.01); *G09G 5/006* (2013.01); *G09G 5/12* (2013.01); *H04N 21/4305* (2013.01); *H04N 21/4307* (2013.01); *G09G 2300/026* (2013.01); *G09G 2320/0252* (2013.01); *G09G 2340/0464* (2013.01)

(58) Field of Classification Search
CPC .. H04N 19/172; H04N 19/17; H04N 21/4305; H04N 21/4307; H04N 21/8547; H04N 21/242; H04N 21/4316; G06F 13/387; G06F 3/1446; G09G 2310/0213; G09G 2310/04; G09G 3/3618
See application file for complete search history.

(56) References Cited

U.S. PATENT DOCUMENTS

| | | | | |
|---|---|---|---|---|
| 6,297,852 B1 * | 10/2001 | Laksono | ................. | G09G 5/12 348/500 |
| 7,068,915 B1 * | 6/2006 | Cho | ...................... | H04N 5/783 386/211 |
| 7,280,156 B2 * | 10/2007 | Roelens | ............ | H04N 21/4341 348/512 |
| 7,480,315 B2 * | 1/2009 | Virdi | ...................... | H04N 7/18 348/E7.085 |

(Continued)

*Primary Examiner* — Dismery Mercedes
(74) *Attorney, Agent, or Firm* — Thorpe North & Western, LLP; David W. Osborne

(57) ABSTRACT

Technology for a display device is described. The display device can include at least one display screen operable to show at least one display panel. The display device can include a controller. The controller can receive a content frame from a content source over a transport topology. The controller can receive a presentation timestamp (PTS) associated with the content frame, where the PTS indicates an earliest time at which the content frame is to be displayed at the display device. The controller can provide the content frame for display on the display panel at a subsequent panel refresh opportunity in accordance with the PTS.

27 Claims, 14 Drawing Sheets

(56) References Cited

U.S. PATENT DOCUMENTS

| | | | |
|---|---|---|---|
| 9,832,515 B2* | 11/2017 | Begen | H04N 21/4305 |
| 9,998,634 B2* | 6/2018 | Molnar | H04N 5/04 |
| 10,419,766 B2* | 9/2019 | LaBosco | H04N 19/146 |
| 2011/0276699 A1* | 11/2011 | Pedersen | H04L 45/24 |
| | | | 709/227 |
| 2011/0302025 A1* | 12/2011 | Hsiao | G06Q 30/0256 |
| | | | 705/14.42 |
| 2012/0027379 A1* | 2/2012 | Thompson | H04N 5/76 |
| | | | 386/241 |
| 2016/0127614 A1* | 5/2016 | Molnar | H04N 5/04 |
| | | | 386/207 |
| 2016/0173883 A1* | 6/2016 | Lawrence | H04N 19/14 |
| | | | 348/46 |
| 2017/0092236 A1* | 3/2017 | Tripathi | G09G 5/395 |
| 2018/0091820 A1* | 3/2018 | Gonzalez | H04N 19/169 |
| 2018/0366068 A1* | 12/2018 | Liu | G06K 9/00281 |

* cited by examiner

| Top Left corner of the region | Bottom Right Corner of the Region | Delta from PTS when the region will be displayed |
|---|---|---|
| X0Y0 for Region 0 | X1Y1 for Region 0 | Delta time from PTS for region 0 |
| X0Y0 for Region 1 | X1Y1 for Region 1 | Delta time from PTS for region 1 |
| X0Y0 for Region 2 | X1Y1 for Region 2 | Delta time from PTS for region 2 |
| X0Y0 for Region 3 | X1Y1 for Region 3 | Delta time from PTS for region 3 |
| X0Y0 for Region 4 | X1Y1 for Region 4 | Delta time from PTS for region 4 |

FIG. 10

TIMING SYNCHRONIZATION BETWEEN A CONTENT SOURCE AND A DISPLAY PANEL

BACKGROUND

Display interfaces can allow audio/video to be transmitted from a source device to a display device. Common types of display interfaces include, but are not limited to, High-Definition Multimedia Interface (HDMI), DisplayPort (DP), embedded DisplayPort (eDP), or Mobile Industry Processor Interface (MIPI) display serial interface (DSI). HDMI is a proprietary audio/video interface for transmitting uncompressed video data and compressed/uncompressed digital audio data from an HDMI-compliant source device, such as a display controller, to a compatible computer monitor, video projector, digital television or digital audio device. HDMI is a digital replacement for analog video standards. DP is a digital display interface that is standardized by the Video Electronics Standards Association (VESA). DP is an interface that is used to connect a video source to a display device, such as a computer monitor, and can carry audio and other forms of data. DP was designed to replace Video Graphics Array (VGA) and Digital Visual Interface (DVI). The DP interface is backward compatible with other interfaces, such as HDMI and DVI. eDP defines a standardized display panel interface for internal connections, e.g., graphics cards to notebook display panels. The MIPI DSI defines a high-speed serial interface between a host processor and a display module. The MIPI DSI enables manufacturers to integrate displays to achieve high performance and improved imagery and video scenes. The MIPI DSI is commonly used for displays in smartphones, tablets, laptops and vehicles.

BRIEF DESCRIPTION OF THE DRAWINGS

Features and advantages of technology embodiments will be apparent from the detailed description which follows, taken in conjunction with the accompanying drawings, which together illustrate, by way of example, technology features; and, wherein:

FIG. 10 is a table with a timing order list of regions for a display panel in accordance with an example embodiment;

Figure 1:
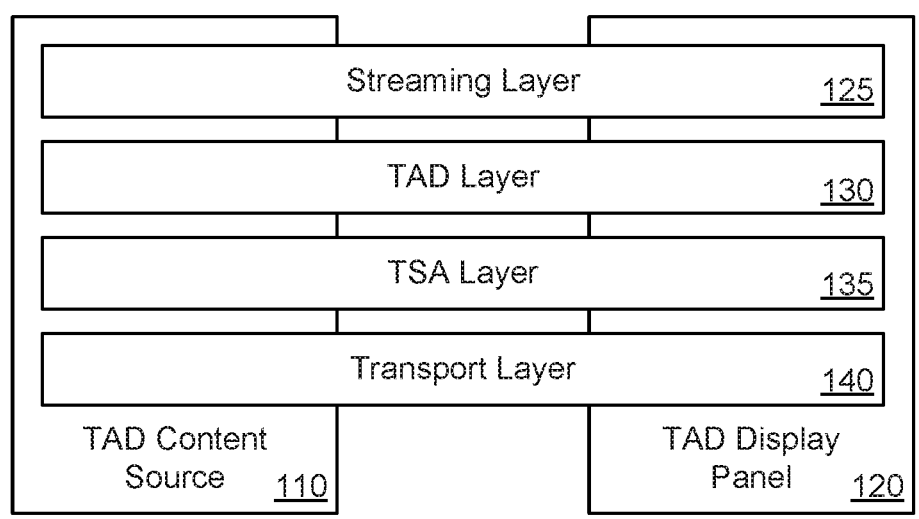
FIG. 1 illustrates a Transport Agnostic Display (TAD) protocol layering in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials articulated herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall concepts articulated herein, but are merely representative thereof.

As used in this written description, the singular forms "a," "an" and "the" include express support for plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment of the present technology. Thus, appearances of the phrases "in an example" or "an embodiment" in various places throughout this specification are not necessarily all referring to the same example or embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of technology embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," or "improved," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Transport Agnostic Display (TAD) is a new video streaming and control protocol for transmission of display streams. The display streams can be carried as native traffic along with non-display traffic over various transports. TAD can be adapted to run over a legacy wired transport for video streaming, e.g., Universal Serial Bus (USB), or a legacy wireless transport, e.g., Institute of Electrical and Electronics Engineers (IEEE) 802.11, or non-traditional transports for video, e.g., Ethernet. The TAD protocol can enable interfacing to monitors implementing legacy transports, such as DisplayPort (DP) or HDMI.

The present technology encompasses inter-frame timing management and timing synchronization between a TAD content source and one or more TAD display panels (or TAD sinks). In TAD, display intra-frame timings can be generated locally in the TAD display panel. In some cases, the TAD display panel can operate with its own independent frame timings, which are asynchronous to the TAD content source, or alternatively, the TAD content source can control the frame timings of the TAD display panel. A single TAD content source can be connected to a single TAD display panel or multiple TAD display panels, and TAD can define mechanisms for handling the timing across the TAD content source and the TAD display panel(s) in these different scenarios. In one example, the inter-frame timing management can involve decoupling a source content rate from a panel refresh rate, which can achieve power and performance optimization. In addition, latency can be minimized through region-based panel timings, and timings can be managed between a single TAD content source and multiple TAD display panels in a wall-of-display system.

Solutions have been sought to achieve generic timing synchronization. For example, legacy display interface solutions, such as DP and HDMI, specifies tightly coupled timings between a content source and a display panel. In these systems, the content source sends frame timings and a pixel clock to the display panel, which are used by the display panel to drive the panel. In another example, generic timing synchronization is achieved by standards that use H.222 based mechanisms for synchronizing time, including terrestrial broadcast or cable, direct broadcast over satellite TV, or Miracast revision 1, where these mechanisms would use a presentation timestamp (PTS) along with a program clock reference (PCR), a target decoder, a transport buffer, and a defined extraction rate. In yet another example, generic timing synchronization is achieved by the IEEE 1588/Precision Time Protocol, which defines mechanisms to synchronize clocks in a distributed system that is connected over a network. In a further example, generic timing synchronization is achieved by IEEE 802.1as, which is a simplification of 1588v2 and defines synchronization over 802.3 (Ethernet) and 802.11 (wireless LAN). IEEE 802.1as can be targeted for media streaming over Miracast, and for time synchronized, low latency services defined by the IEEE Audio Video Bridging Task Group/Time Sensitive Networking Task Group.

The foregoing solutions for achieving generic timing synchronization suffered from various disadvantages. For example, DP and HDMI follow a non-Internet Protocol (non-IP) based custom definition scheme where a content source has full control over the transmission of each pixel at a desired time, but these definitions are tied closely to the DP and HDMI standards. The tightly coupled timings between the content source and the display panel in HDMI and DP result in reduced performance and increased power consumption. Furthermore, IEEE 1588 and 802.1as define synchronization mechanisms on specific protocols. The H.222 definition includes framework elements for clock synchronization that are also typically used over IP. These solutions focus on defining a framework for timely delivery of a specific packet or pixels from a content source to one or more display panels, but do not address the problem of inter-frame timing or applicability to specific use cases, such as low latency panels or scheduling for a wall of displays.

In one example, TAD is a new protocol that enables a display stream to be transmitted over various transports. TAD defines a framework to synchronize time for video streaming over diverse transports such as USB, 802.11, or Ethernet. TAD is agnostic of the transport, and the mechanism used by Transport Specific Adaptation (TSA) layers to adapt TAD to those transports. For example, some adaptations (such as for Ethernet or 802.11) can map TAD to use a user datagram protocol (UDP) on Internet Protocol version 4 (IPv4) or Internet Protocol version 6 (IPv6). Some other adaptations (e.g., USB) can target transport over native constructs (e.g., bulk endpoints) despite also supporting mappings for UDP over IP. A higher order application level definition of transport agnostic inter-frame timing can be defined, and synchronization that is transport agnostic. In some examples, TAD can build on top of IEEE 1588 or 802.1as or H.222 to enable its target services.

FIG. 1 illustrates an example of a Transport Agnostic Display (TAD) protocol end-to-end layering of devices with TAD implementations. For example, the end-to-end layering is shown between a TAD content source 110 and a TAD display panel 120 (or TAD sink). The end-to-end layering can include a streaming layer 125, a TAD layer 130, a Transport Specific Adaptation (TSA) layer 135 and a transport layer 140. The streaming layer 125 can be responsible for originating, managing and terminating video stream(s) between the TAD content source 110 and the TAD display panel 120. The TAD layer 130 can be responsible for configuring, managing, packetizing and encrypting a single TAD video stream between the TAD content source 110 and the TAD display panel 120. The TSA layer 135 can be responsible for adapting a transport agnostic TAD video stream to a specific transport. In addition, the transport layer 140 can be a physical bus that carries TAD video stream(s) between the TAD content source 110 and the TAD display panel 120.

In one example, the TAD content source 110 can be separate from the TAD display panel 120 that shows frame data. For example, the TAD content source 110 can be remotely located or external to the TAD display panel 120. On the other hand, in some cases, the TAD content source 110 can be integrated with the TAD display panel 120. In this example, the TAD content source 110 can be internal to the TAD display panel 120.

In one example, the transport layer 140 can have a notion of a transport time, which can be a common time at the transport layer 140 between the TAD content source 110 and the TAD display panel 120. In addition, a local time can be used to identify a common time base between the TAD content source 110 and the TAD display panel 120, where the local time can be derived from an operating system time.

Figure 2:
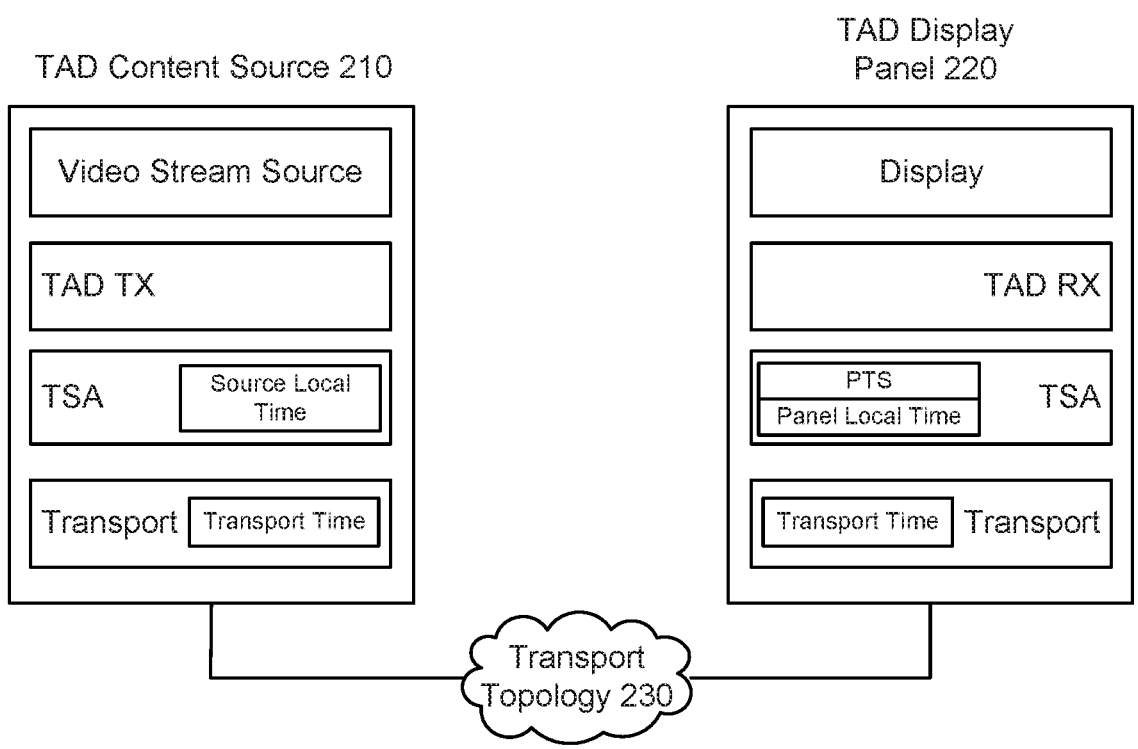
FIG. 2 illustrates a time base for a TAD content source and a TAD display panel in accordance with an example embodiment.

FIG. 2 illustrates an example of a time base for a Transport Agnostic Display (TAD) content source 210 and a TAD display panel 220 (or TAD sink). The TAD content source 210 and the TAD display panel 220 can be connected via a transport topology 230. The TAD content source 210 may include a video stream source, a TAD transmitter (Tx), a TSA layer and a transport layer. The TAD display panel 220 may include a display, a TAD receiver (Rx), a TSA layer and a transport layer. In one example, a local time can be used to identify a common time base between the TAD content source 210 and the TAD display panel 220. For example, the TAD content source 210 can include a source local time and the TAD display panel 220 can include a panel local time, where the source local time and the panel local time can be derived from an operating system time. In another example, a transport time can be a common time at the transport layer between the TAD content source 210 and the TAD display panel 220. For example, the TAD content source 210 and the TAD display panel 220 can both include the transport time.

In one example, TAD can define a framework to discover an aggregated delay through an entire transport topology 230 between the TAD content source 210 and the TAD display panel 220.

In some solutions, legacy display interfaces such as DP and HDMI necessitates that panel timings be driven from a content source. In other words, in such solutions, the content source specifies a refresh rate for the display panel.

In one example of the present technology, the TAD protocol can decouple a content refresh rate from a panel refresh rate through a presentation timestamp (PTS), as shown in FIG. 2. The content refresh rate can refer to a rate at which content is being provided by the TAD content source 210, whereas the panel refresh rate can refer to a rate at which the TAD display panel 120 is refreshing content that is being displayed. The ability to decouple the content refresh rate from the panel refresh rate can be helpful for the transport of display and non-display streams as native traffic over a given (or any) transport.

In one configuration, the TAD content source 210 can generate a PTS, which can represent a desired time for a frame to be displayed by the TAD display panel 220. The PTS can be expressed in local time units. The TAD content source 210 can send a PTS to the TAD display panel 220 for each new frame that is to be displayed. The TAD display panel 220 can receive the frame and the corresponding PTS from the TAD content source 210, and the TAD display panel 220 can display the frame at the PTS or at a next content refresh opportunity at the TAD display panel 220 after the PTS.

Figure 3:
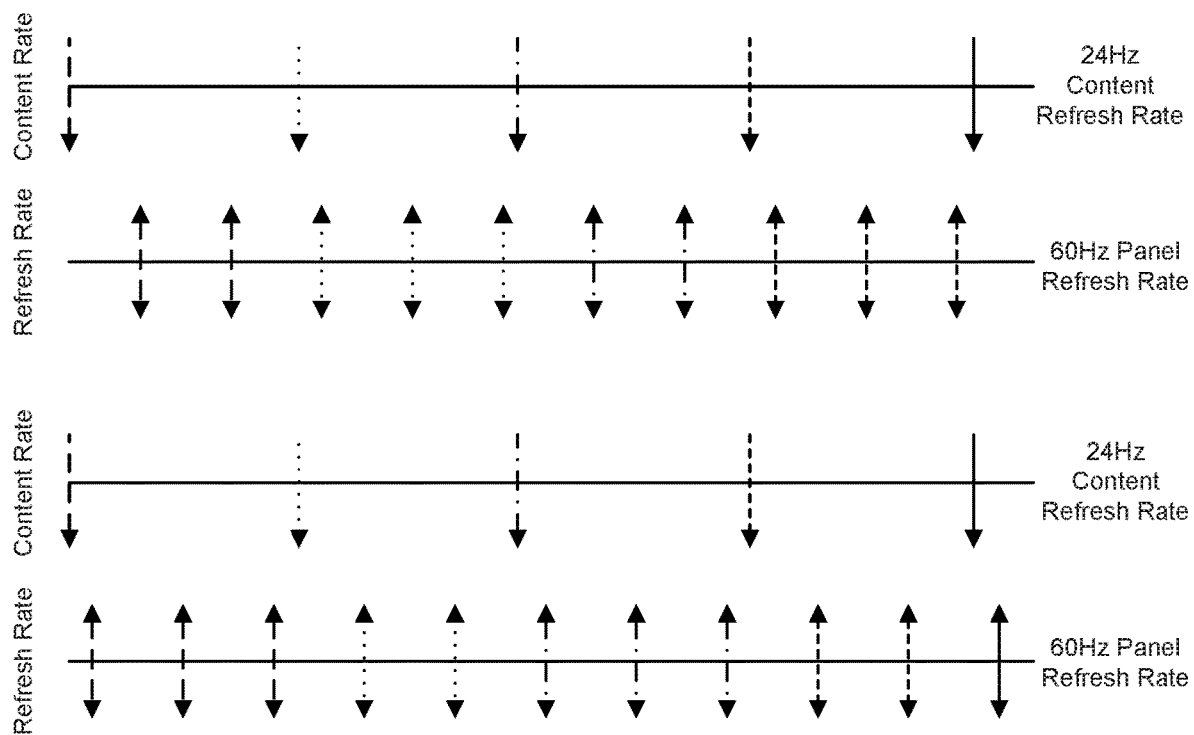
FIG. 3 illustrates a misalignment between a content refresh rate and a panel refresh rate in accordance with an example embodiment.

FIG. 3 illustrates an example of a misalignment between a content refresh rate and a panel refresh rate. In this example, the content refresh rate can be decoupled from the panel refresh rate, unlike in some other solutions, in which the panel refresh rate is driven by the content refresh rate of a content source. In the examples shown in FIG. 3, the content refresh rate is 24 Hertz (Hz) and the panel refresh rate is 60 Hz. In other words, in this example, the panel can be refreshed at a rate (e.g., 60 Hz) that is greater than a rate (e.g., 24 Hz) at which content is provided from the content source. Therefore, as shown in FIG. 3, the panel can refresh with the same content (e.g., the same content frame can be refreshed multiple times at the panel) until new content is received from the content source. New content that is received from the content source can be displayed at a next content refresh opportunity at a TAD display panel.

In one example, the PTS can indicate that the corresponding frame is to be displayed as soon as possible. In this example, the TAD display panel may or may not have a common time base, and the TAD display panel can run on its own local frame timings which can be completely asynchronous to source content frame timings. Thus, in this example, the frame can be displayed as soon as possible based on an availability of adequate data ready for display in the TAD display panel.

Referring back to FIG. 2, in one configuration, the TAD protocol can provide a framework that enables the TSA in the TAD display panel 220 (Panel TSA) to generate a synchronization timestamp (STS). The STS can represent a time when the TAD display panel 220 will refresh a first pixel of its frame on a screen. The Panel TSA in the TAD display panel 220 can generate the STS at a refresh rate based on the panel local time of the TAD display panel 220. The Panel TSA can generate the STS, and the Panel TSA can communicate the STS to the TAD RX in the TAD display panel 220. The TAD RX can forward the STS to the display associated with the TAD display panel 220.

In one example, the TAD RX in the TAD display panel 220 can receive new frame content at the content refresh rate from the TAD content source 210, along with a corresponding PTS value specifying an earliest time (in common time units) at which the frame is to be displayed at the TAD display panel 220. The TAD TX in the TAD content source 210 can configure the Panel TSA (or the TSA layer) to generate the STS at a desired refresh rate (e.g., the refresh rate based on the panel local time). When a timing controller (TCON) in a display/panel or monitor associated with the TAD display panel 220 is running on an asynchronous pixel clock, the TCON can maintain generator locking (Genlock) with the STS by adjusting its pixel clock, such that the panel refresh rate matches that of the STS. In other words, using a Genlock technique, the panel refresh rate can be time synchronized with the STS at the TAD display panel 220. In addition, for panels with adaptive sync capability, the Panel TSA can be capable of generating the STS as per the adaptive sync timings.

In one example, when configured by the TAD TX in the TAD content source 210, the Panel TSA in the TAD display panel 220 can generate the STS for every frame until reconfigured to stop generating the STS. When there is no new frame from the TAD content source 210, the TAD display panel 220 can replay a last frame from its local buffer at the STS. When a new frame is received from the TAD content source 210, the TAD display panel 220 can display the new frame at the STS that is equal to a source PTS time or at a next STS time after the source PTS time.

In one example, in adaptive sync panels, when a source PTS is within a flip window between a maximum and a minimum refresh rate, the TSA layer can generate a STS matching the source PTS. Otherwise, the TSA layer can generate a STS corresponding to a lowest refresh rate.

Figure 4:
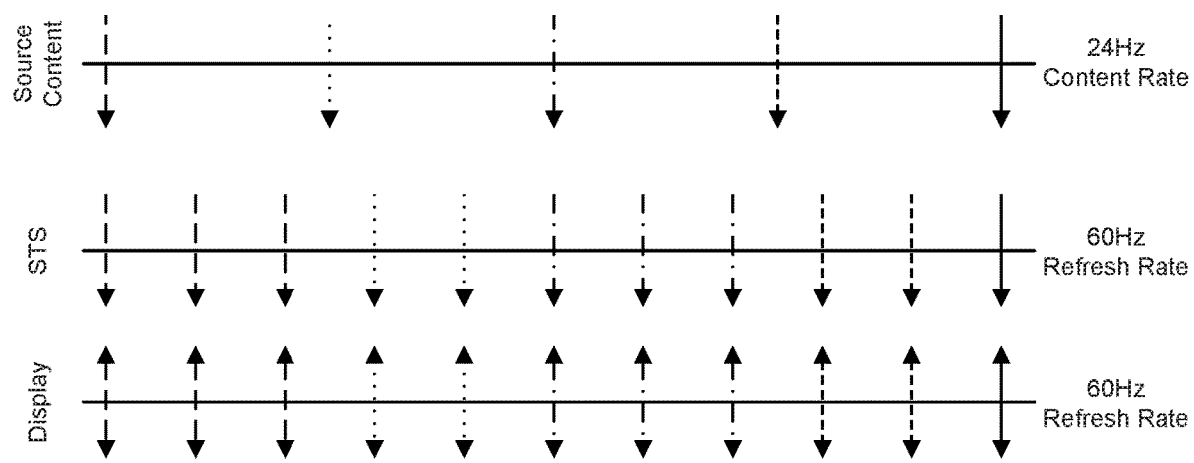
FIG. 4 illustrates a timing synchronization between a synchronization timestamp (STS) and a panel refresh rate in accordance with an example embodiment.

FIG. 4 illustrates an example of a timing synchronization between a synchronization timestamp (STS) and a panel refresh rate. In this example, the source content (or the content refresh rate) is being provided at 24 Hz and the STS is generated at 60 Hz. The panel refresh rate can also be set to 60 Hz, to correspond with the STS. As previously described, the STS can be generated at a Panel TSA of a TAD display panel. In this example, content frames can be refreshed at the TAD display panel at a rate of 60 Hz, and a given content frame can correspond with an STS. Thus, the panel refresh rate can be time synchronized with the STS.

In one configuration, with respect to a wall of display panels and synchronization timestamps (STS), multiple video streams from a TAD content source to a TAD display panel (or TAD sink) driving multiple display panels can constitute a wall-of-displays. For the wall-of-displays, all of the display panels are to be refreshed concurrently. In this configuration, as part of an initialization, the TAD content source can set up STS generation to a desired fixed or adaptive refresh rate. The TAD content source can also specify the STS for a first frame. Based on this initialization, a Panel TSA can generate the first frame based on the initialized STS, and the Panel TSA can continue to generate the STS at the configured rate. Since the STS can be based on local time, which is common between all TSA layers, all of the TSA layers can generate an identical local PTS. As a result, all of the TAD display panels (or TAD sinks) can display content frames at the STS, as well as maintain Genlock with the local time. Thus, all of the TAD display panels can operate in a synchronous manner.

Figure 5:
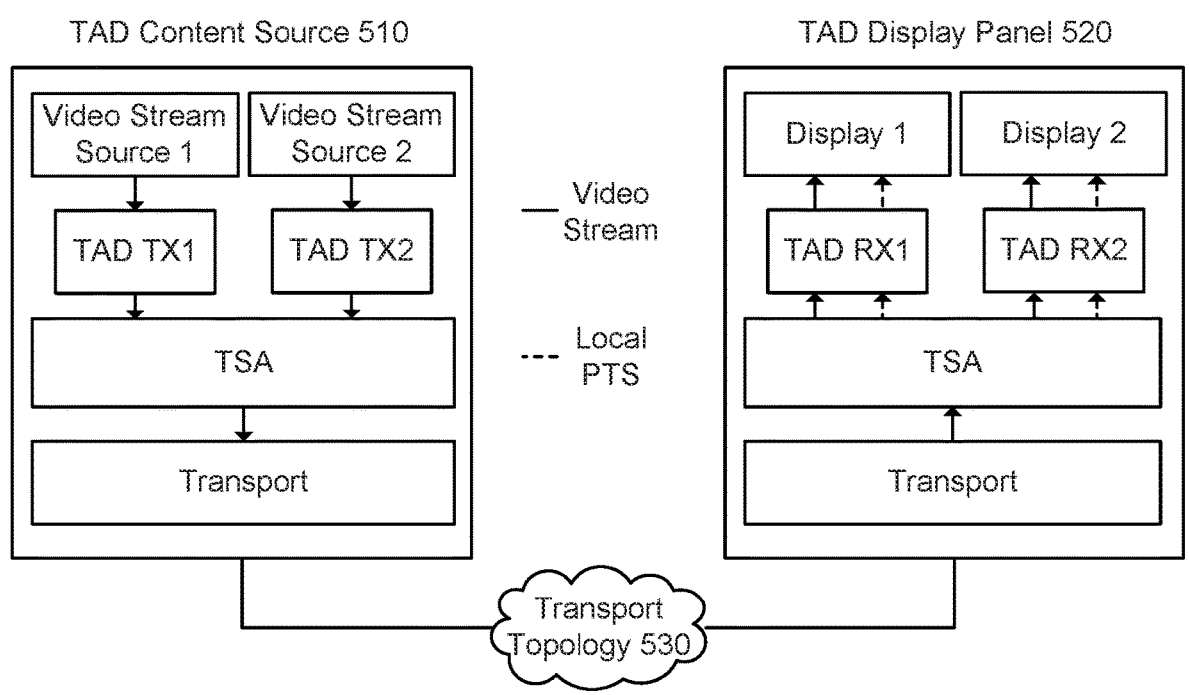
FIG. 5 illustrates multiple video streams being provided from a TAD content source to a TAD display panel with multiple display panels for synchronous display in accordance with an example embodiment.

FIG. 5 illustrates an example of multiple video streams being provided from a TAD content source 510 to a TAD display panel 520 (or TAD sink) with multiple display panels (or a wall-of-displays) for synchronous display of the video streams. The multiple video streams can include a video stream source 1 and a video stream source 2, which can be provided to a TAD TX1 and a TAD TX2, respectively, in the TAD content source 510. The multiple video streams can be sent to the TAD display panel 520 over a transport topology 530. The multiple video streams can be provided to a TAD RX1 and a TAD RX2, respectively, in the TAD display panel 520, which can then forward the multiple video streams to a display 1 and a display 2, respectively. Each video stream can be synchronized with an STS, which can be generated at a TSA of the TAD display panel 520. The display 1 and display 2 can both be connected to the TSA over a same transport topology. As a result, the display 1 and display 2 associated with the TAD display panel 520 can operate in a synchronous manner.

Figure 6:
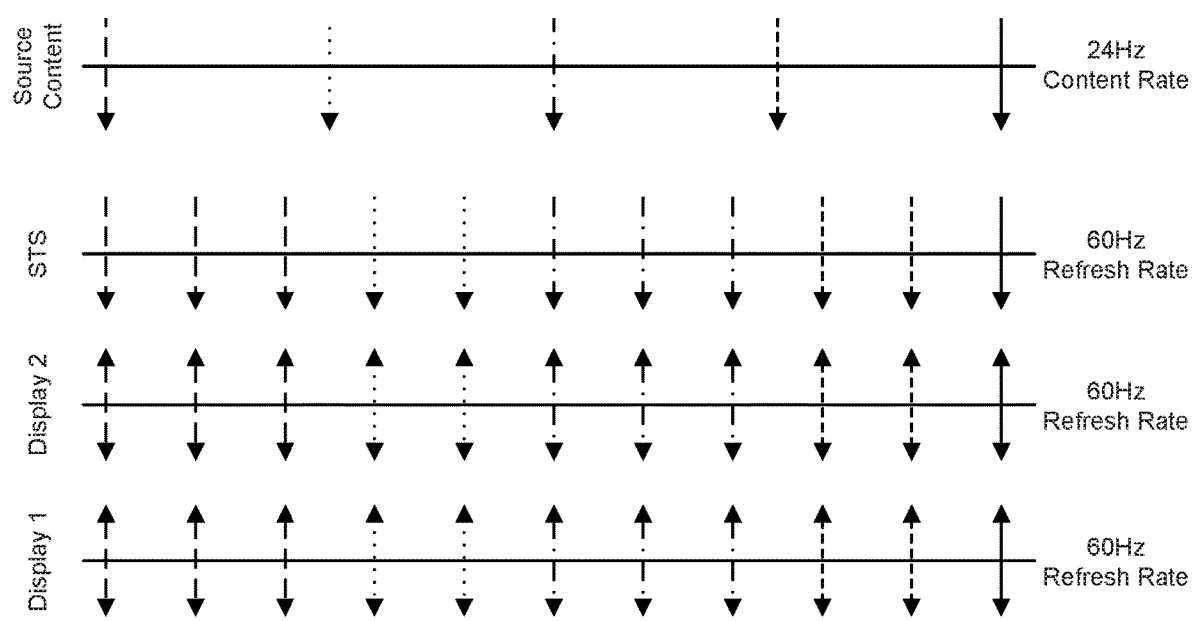
FIG. 6 illustrates a timing synchronization between a synchronization timestamp (STS) and multiple panel refresh rates associated with multiple display panels in accordance with an example embodiment.

FIG. 6 illustrates an example of timing synchronization between a synchronization timestamp (STS) and multiple panel refresh rates associated with multiple display panels. In this example, the source content (or the content refresh rate) is being provided at 24 Hz and the STS can be generated at 60 Hz. The STS can be generated at a single TSA layer of a TAD display panel and can be common for the two display panels associated with the TAD display panel. In other words, a panel refresh rate for each of the two display panels associated with the TAD display panel can also be set to 60 Hz, to correspond with the STS. In this example, content frames can be refreshed at each of the two display panels of the TAD display panel at a rate of 60 Hz. Thus, the STS can enable the two display panels of the TAD display panel to be time synchronized with each other.

In one configuration, a wall-of-displays can include two separate TAD display panels (or TAD sinks) that are connected over two independent transport topologies to a TAD content source. The TAD protocol can provide a mechanism to synchronize and resynchronize local time between the TSA layers. Each TSA layer in a TAD display panel can generate an STS based on local time. Since local time is in sync, the STS generated by the two TSA layers (corresponding to the two TAD display panels) will also be in sync. In this example, similar to as previously discussed, the TAD display panels can GenLock their local pixel clock to align with the STS. As a result, each of the TAD display panels can be time synchronized with respect to a synchronized STS.

Figure 7:
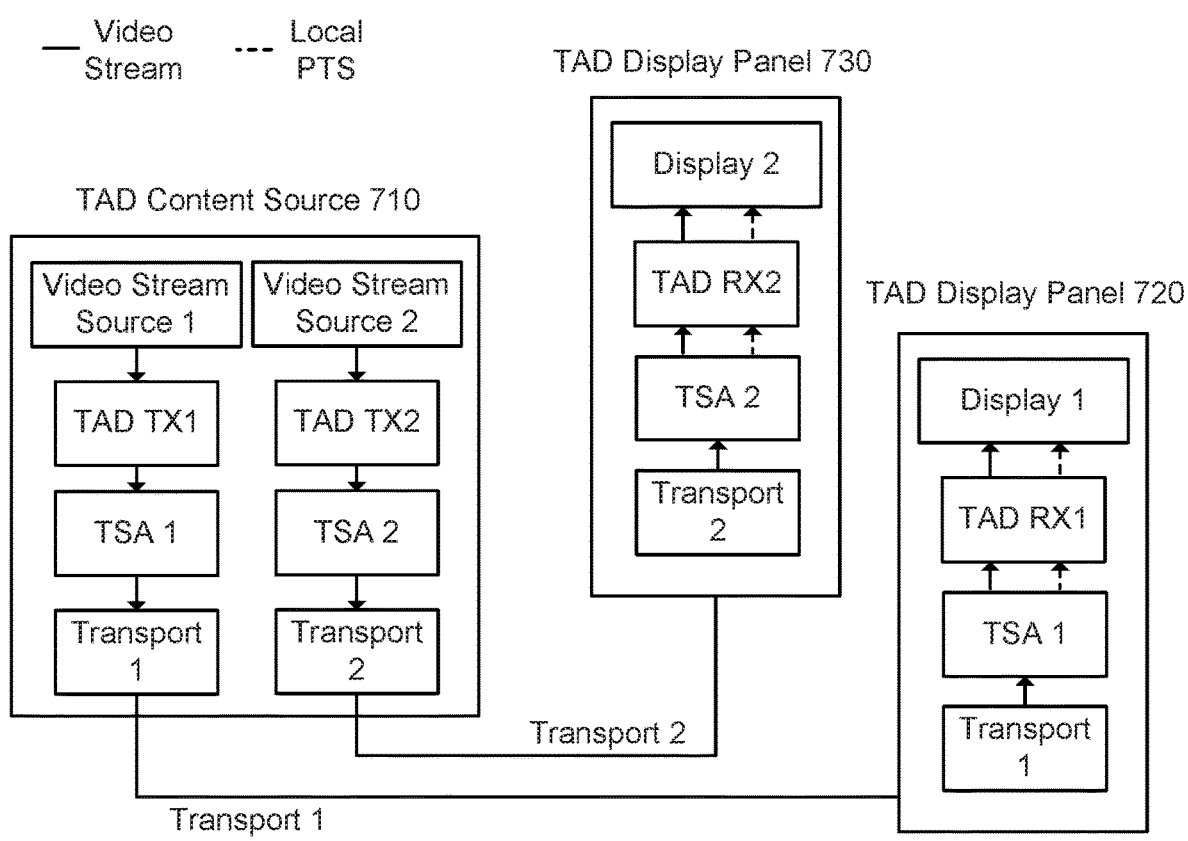
FIG. 7 illustrates a TAD content source that is connected to multiple TAD display panels in accordance with an example embodiment.

FIG. 7 illustrates an example of a TAD content source 710 that is connected to multiple TAD display panels (or TAD sinks), such as a first TAD display panel 720 and a second TAD display panel 730. The TAD content source 710 can generate multiple video streams, such as a video stream source 1 and a video stream source 2, which can be provided to a TAD TX1 and a TAD TX2, respectively, in the TAD content source 710. The video stream source 1 and the video stream source 2 can be provided to a source TSA1 and a source TSA2, respectively, and then to a source transport 1 and a source transport 2, respectively, in the TAD content source 710.

In one example, the source transport 1 can forward the video stream 1 over a first transport topology (Transport 1) to the first TAD display panel 720. The video stream 1 can be provided to a TSA1 of the first TAD display panel 720, and then to a TAD RX1 of the first TAD display panel 720, and then to a display 1 associated with the first TAD display panel 720. Similarly, the source transport 2 can forward the video stream 2 over a second transport topology (Transport 2) to the second TAD display panel 730. The video stream 2 can be provided to a TSA2 of the second TAD display panel 730, and then to a TAD RX2 of the second TAD display panel 730, and then to a display 2 associated with the second TAD display panel 730.

As shown in FIG. 7, the TSA1 and the TSA2 in the first TAD display panel 720 and the second TAD display panel 730, respectively, can generate an STS based on local time. Since the local time is in sync, the STS generated at the first and second TAD display panels 720, 730 can be synchronized as well. As a result, the first and second TAD display panels 720, 730 can be time synchronized with respect to a synchronized STS.

Figure 8:
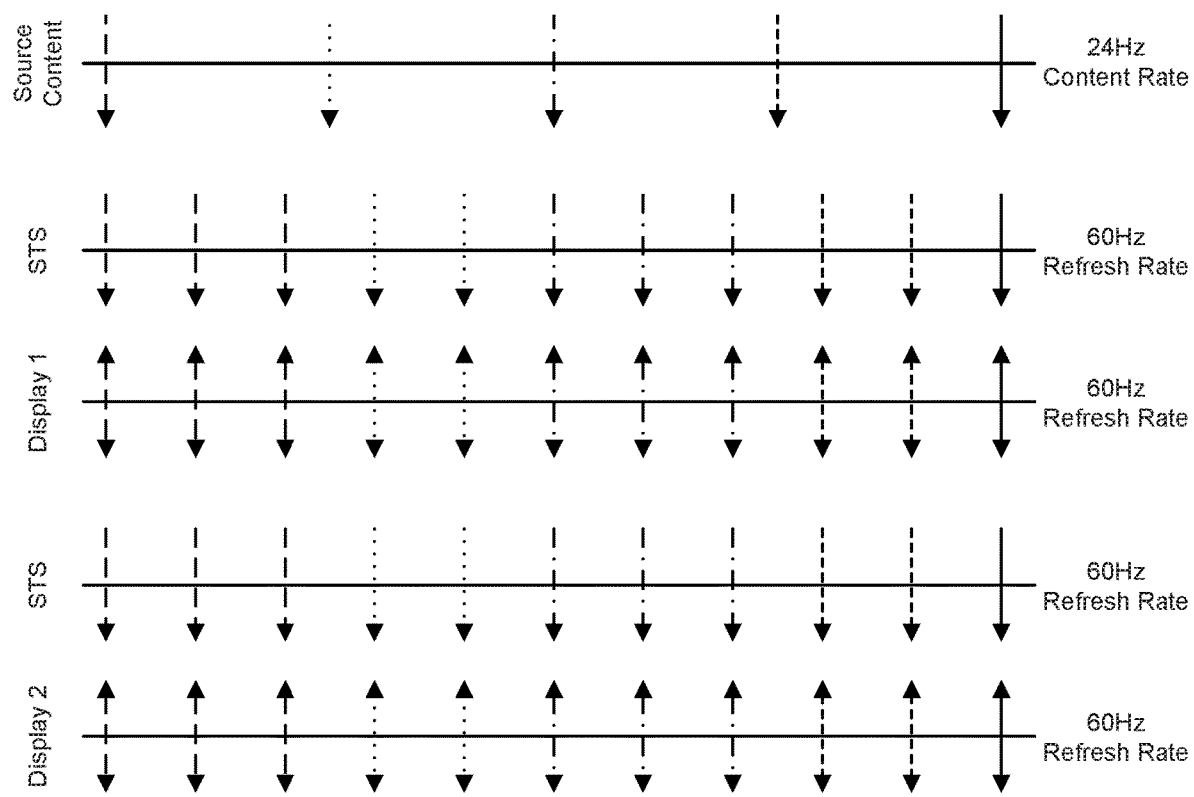
FIG. 8 illustrates a timing synchronization between multiple synchronization timestamps (STS) for multiple panel refresh rates associated with multiple display panels, respectively, in accordance with an example embodiment.

FIG. 8 illustrates an example of a timing synchronization between multiple synchronization timestamps (STS) for multiple panel refresh rates associated with multiple display panels, respectively. In this example, the source content (or the content refresh rate) is being provided at 24 Hz. A first STS associated with a first TSA layer of a first TAD display panel can be generated at 60 Hz. A panel refresh rate for the first TAD display panel can also be set to 60 Hz, to correspond with the first STS. Similarly, a second STS associated with a second TSA layer of a second TAD display panel can be generated at 60 Hz. A panel refresh rate for the second TAD display panel can also be set to 60 Hz, to correspond with the second STS. Since the first STS and the second STS can be generated based on local time, and the local time is in sync, both the first STS and the second STS can be set to the same 60 Hz. As a result, timing synchronization can be achieved in a dual TSA and dual TAD display panel configuration.

In one configuration, with respect to a wall of displays and tightly coupled source and sink frame timings, in configuration in which a TSA in a TAD display panel (or TAD sink) is not generating a STS, a TAD content source can quantize a content refresh rate to match to a desired panel refresh rate. The TAD content source can broadcast a common PTS to all of the TAD display panel(s). At initialization, the TAD content source can send a PTS for a first frame to all of the TAD display panel(s). The TAD content source can also send a PTS at a minimum cadence to prevent drift and to keep the TAD content source and the TAD display panel(s) in sync. The TAD display panel(s) can Genlock the panel refresh rate to the PTS from the TAD content source.

In one configuration, with respect to region based displays, classic timings based on panel resolution, scan order, refresh rate, start time, processing delay, etc. can cause difficulty when used for complex displays, such as a single TAD content source stream that is driving a wall-of-displays. Furthermore, classic timings do not provide a mechanism for optimizing latency in complex and new emerging display technologies, such as memory based or "instantaneous" refresh displays. These shortcomings found in classic timings are mitigated in region based display timings, which is a new technology in which the display can be defined as a collection of regions. Each region in the collection of regions can refresh at a PTS (or STS) or at a fixed delta time from the PTS (or STS).

Figure 9A:
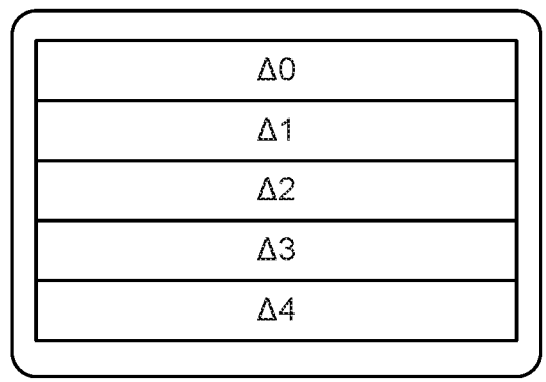
FIGS. 9A, 9B and 9C illustrate region based displays in accordance with an example embodiment.
Figure 9B:
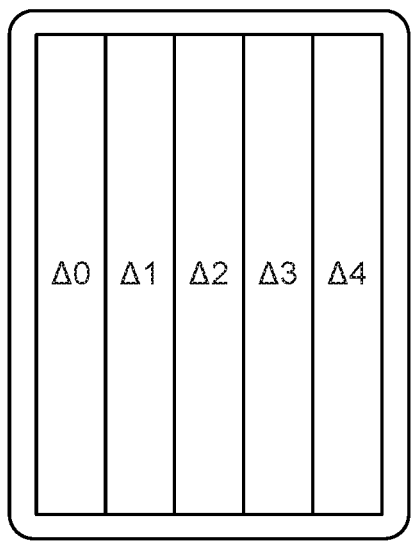
Figure 9C:
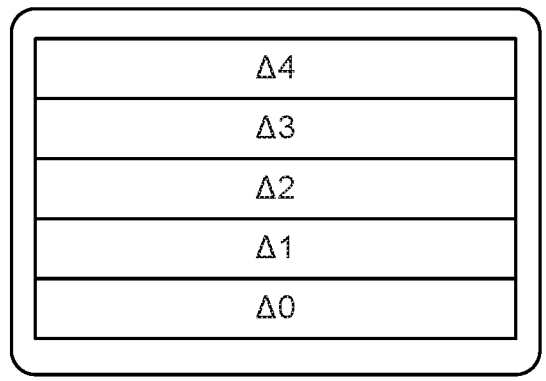

FIGS. 9A, 9B and 9C illustrate examples of region based displays. FIG. 9A illustrates a classic top down display with five separate regions. FIG. 9B illustrates a left to right display with five separate regions. FIG. 9C illustrates a bottom up display with five separate regions. In FIGS. 9A, 9B and 9C, each of the five separate regions is associated with a fixed delta time (e.g., Δ0, Δ1, Δ2, Δ3, Δ4).

In one example, the region based displays shown in FIGS. 9A, 9B and 9C can include a plurality of rectangular shapes. The plurality of rectangular shapes can have a long side disposed in a vertical orientation on the region and/or the plurality of rectangular shapes can have a long side disposed in a horizontal orientation on the region.

In one configuration, after a TAD content source completes a capability discovery and display configuration phase, in which a panel resolution, refresh rate, encoding format, compression technology etc., is set up, a panel can populate a Timing Order List of rectangles. The Timing Order List can provide coordinates of a region and a time delta from a PTS when the region is to be displayed. For example, each region can refresh at the PTS or at the STS or at the fixed delta time from the PTS or the STS in accordance with a timing order, where the timing order is one of: a top to bottom time order, a bottom to top time order, a left to right time order or a right to left time order.

FIG. 10 is an exemplary table with a timing order list of regions for a display panel. The timing order list can include coordinates of top left and bottom right corners of a region along with a delta time from PTS. For example, with respect to a top left corner of X0Y0 for Region 0, a bottom right corner of X1Y1 for Region 0, a corresponding delta time from PTS for Region 0 can be defined. With respect to a top left corner of X0Y0 for Region 1, a bottom right corner of X1Y1 for Region 1, a corresponding delta time from PTS for Region 1 can be defined, and so on.

In one configuration, to avoid tears, a TAD content source can send data for an entire region prior to a PTS and delta time for that region. The TAD content source can combine multiple regions into one region. In this case, all data for the combined region can be expected to be ready for display at a PTS plus lowest (or worst case delta) of the combined regions.

In one configuration, region based displays can support low latency when using the Timing Order List. For example, for a wall-of-display configuration with multiple panels, when a TAD display panel (or TAD sink) is STS capable, a Panel TSA can generate the STS for each display panel based on its refresh rate and delta time. The TAD content source can provide a PTS to the TAD display panel, and each display panel (or panel region) can refresh at its STS after the PTS.

Figure 11A:
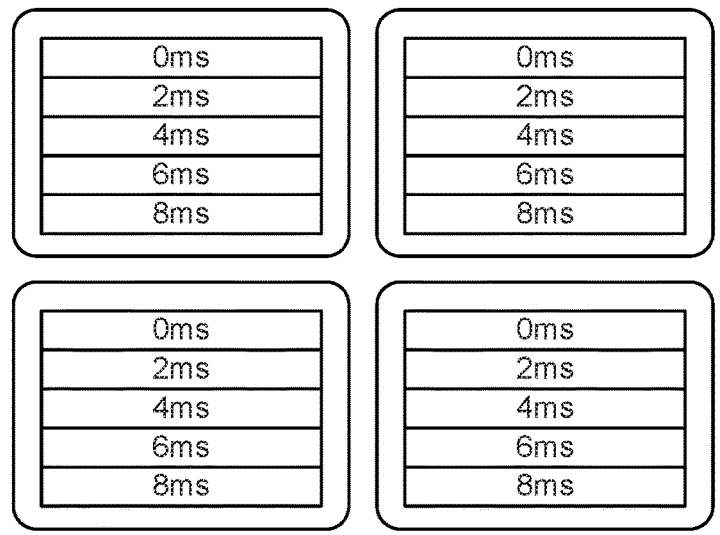
FIGS. 11A, 11B and 11C illustrate region based displays with different configurations in accordance with an example embodiment.
Figure 11B:
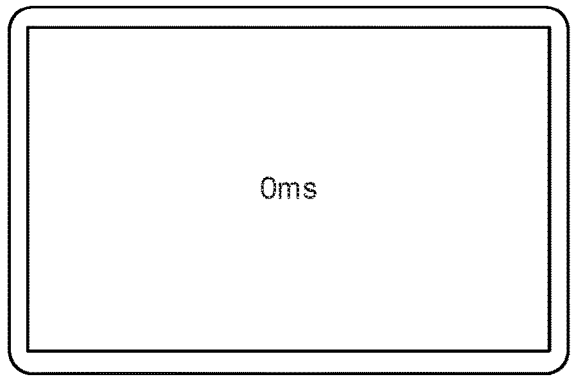
Figure 11C:
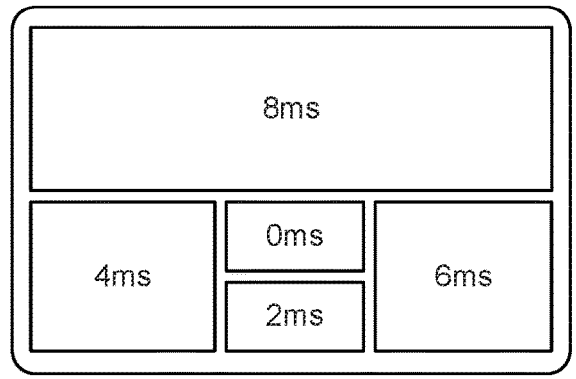

FIGS. 11A, 11B and 11C illustrate examples of region based displays with different configurations. FIG. 11A illustrates a 2×2 wall of displays, where each display wall includes five separate regions with a fixed latency of 0 ms, 2 ms, 4 ms, 6 ms or 8 ms, respectively. FIG. 11B illustrates an instant display with a single region with a fixed latency of 0 ms. FIG. 11C illustrates a collage of displays, which can include a first region with a latency of 0 ms, a second region with a latency of 2 ms, a third region with a latency of 4 ms, a fourth region with a latency of 6 ms and a fifth region with a latency of 8 ms.

Figure 12:
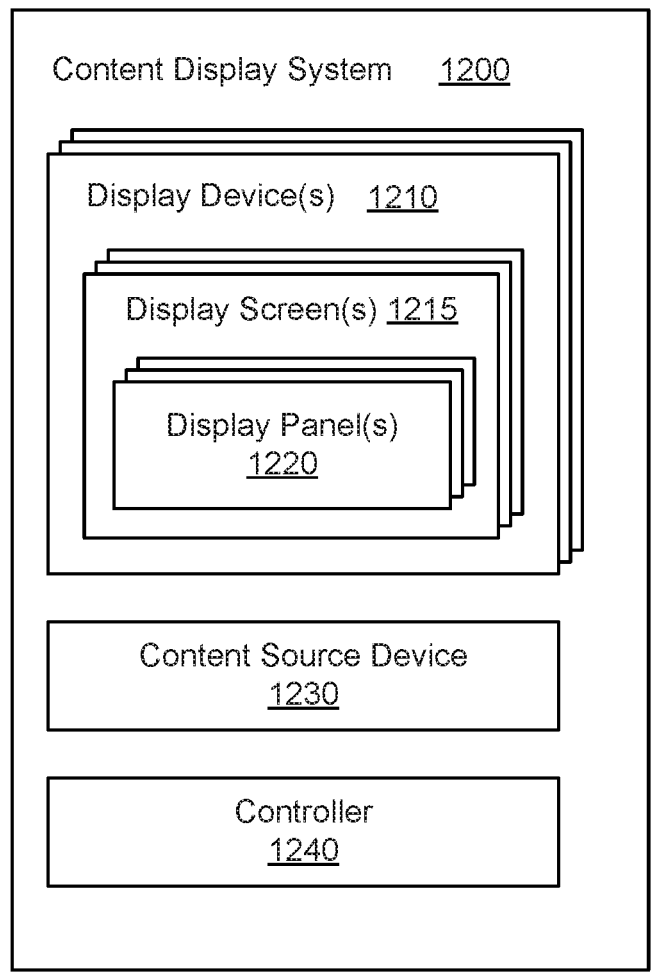
FIG. 12 illustrates a content display system in accordance with an example embodiment.

FIG. 12 illustrates an example of a content display system 1200. The content display system 1200 can include a display device 1210. The display device 1210 can include at least one display screen 1215 operable to show at least one display panel 1220. The content display system 1200 can include a content source device 1230. Furthermore, the content display system 1200 can include a controller 1240. The controller 1240 can include logic to receive a content frame from the content source device 1230 over a transport topology. The controller 1240 can include logic to receive a presentation timestamp (PTS) associated with the content frame, where the PTS can indicate an earliest time at which the content frame is to be displayed at the display device 1210. The controller 1240 can include logic to provide the content frame for display on the display panel 1220 at a subsequent panel refresh opportunity in accordance with the PTS.

Figure 13:
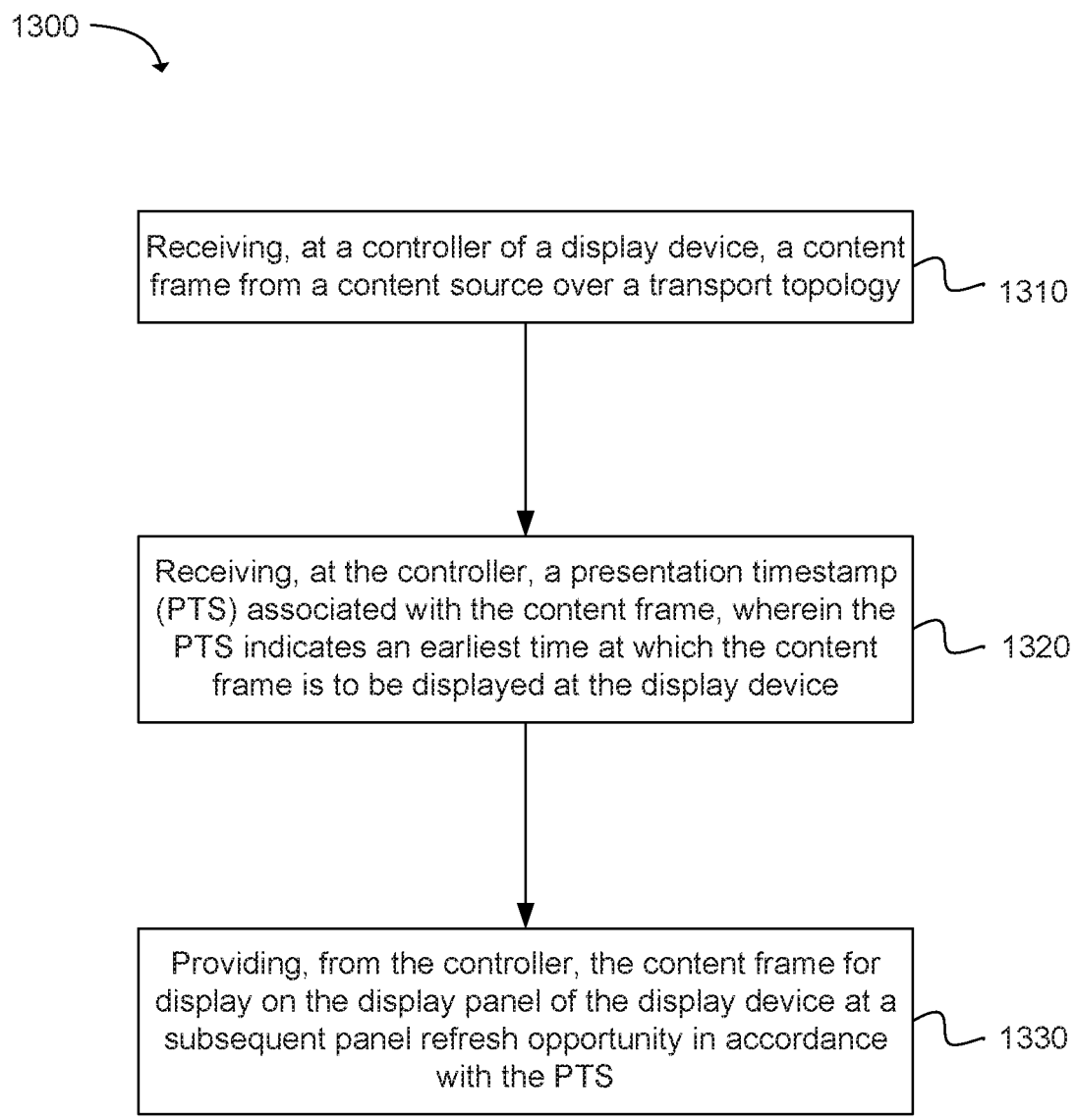
FIG. 13 is a flowchart illustrating operations for providing content frames for display on a display panel of a display device in accordance with an example embodiment.

Another example as shown in FIG. 13, provides a method 1300 for providing content frames for display on a display panel of a display device. The method can be executed as instructions on a machine, where the instructions are included on at least one computer readable medium or one non-transitory machine readable storage medium. The method can include the operation of: receiving, at a controller of a display device, a content frame from a content source over a transport topology, as in block 1310. The method can include the operation of: receiving, at the controller, a presentation timestamp (PTS) associated with the content frame, wherein the PTS indicates an earliest time at which the content frame is to be displayed at the display device, as in block 1320. The method can include the operation of: providing, from the controller, the content frame for display on the display panel of the display device at a subsequent panel refresh opportunity in accordance with the PTS, as in block 1330.

Figure 14:
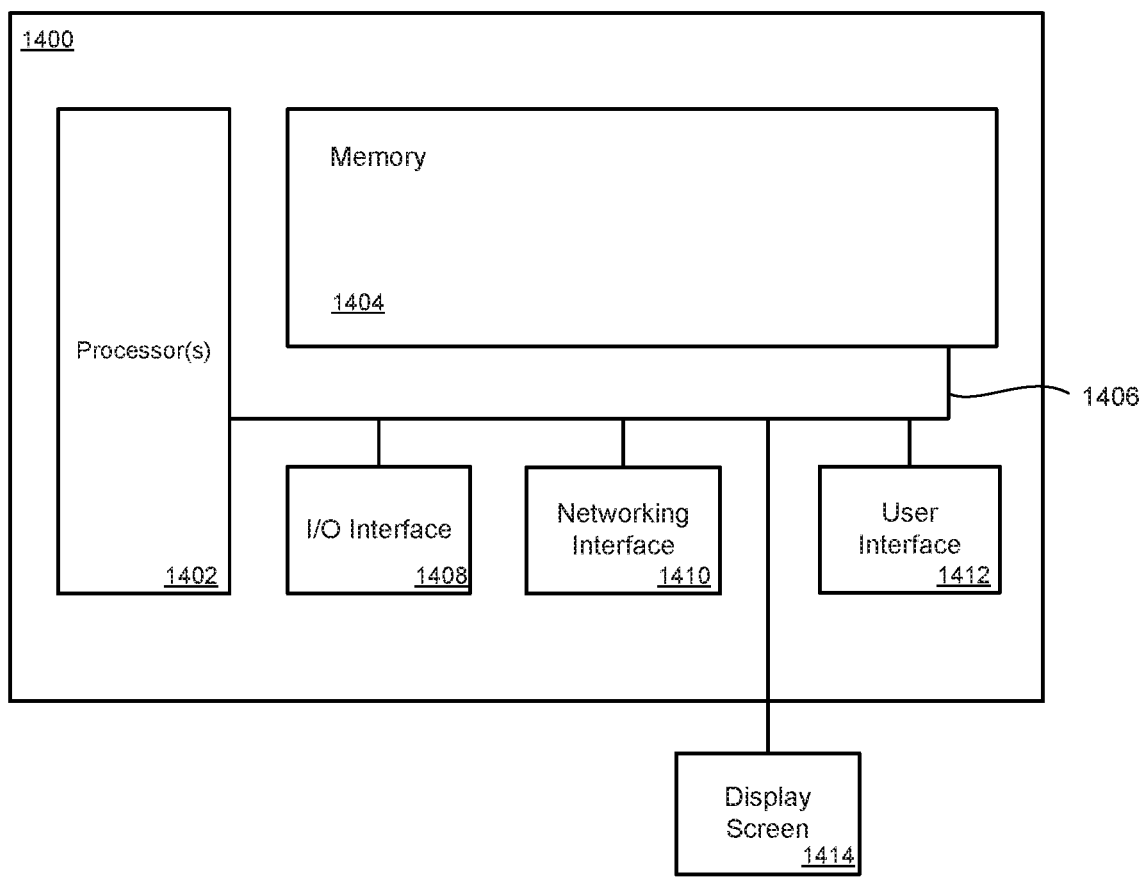
FIG. 14 illustrates a computing system that includes a data storage device in accordance with an example embodiment.

FIG. 14 illustrates a general computing device 1400 that can be employed in the present technology. The computing device 1400 can include a processor 1402 in communication with a memory 1404. The memory 1404 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing device 1400 additionally includes a local communication interface 1406 for connectivity between the various components of the system. For example, the local communication interface 1406 can be a local data bus and/or any related address or control busses as may be desired.

The computing device 1400 can also include an I/O (input/output) interface 1408 for controlling the I/O functions of the system, as well as for I/O connectivity to devices outside of the computing device 1400. A network interface 1410 can also be included for network connectivity. The network interface 1410 can control network communications both within the system and outside of the system. The network interface can include a wired interface, a wireless interface, a Bluetooth interface, optical interface, and the like, including appropriate combinations thereof. Furthermore, the computing device 1400 can additionally include a user interface 1412, a display device 1414, as well as various other components that would be beneficial for such a system.

The processor 1402 can be a single or multiple processors, and the memory 1404 can be a single or multiple memories. The local communication interface 1406 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example there is provided a display device, comprising: at least one display screen operable to show at least one display panel; and a controller, comprising logic to: receive a content frame from a content source over a transport topology; receive a presentation timestamp (PTS) associated with the content frame, wherein the PTS indicates an earliest time at which the content frame is to be displayed at the display device; and provide the content frame for display on the display panel at a subsequent panel refresh opportunity in accordance with the PTS.

In one example of the display device, the controller comprises logic to: receive the content frame from the content source in accordance with a content refresh rate; and provide the content frame for display on the display panel in accordance with a panel refresh rate, wherein the content refresh rate and the panel refresh rate are expressed in Hertz (Hz).

In one example of the display device: the PTS serves to decouple the content refresh rate from the panel refresh rate, such that the content refresh rate is different from the panel refresh rate; and the subsequent panel refresh opportunity occurs at the PTS or after the PTS.

In one example of the display device, the controller comprises logic to: provide a last content frame from a local buffer for replay on the display panel at a following panel refresh opportunity when there is no new content frame received from the content source.

In one example of the display device, the controller comprises logic to: generate a synchronization timestamp (STS) for the content frame, wherein the STS is based on units of local time; adjust a panel refresh rate of the display panel to align with the STS; and provide the content frame for display on the display panel at the STS, wherein the STS is equal to the PTS associated with the content frame or the STS occurs at the subsequent panel refresh opportunity after the PTS.

In one example of the display device, the controller comprises logic to: generate the STS in response to a configuration received from the content source, wherein the controller generates the STS for every content frame until a reconfiguration is received from the content source to stop generating the STS.

In one example of the display device, the controller comprises logic to: provide a last content frame from a local buffer for replay on the display panel at a next STS when there is no new content frame received from the content source.

In one example of the display device, the controller comprises logic to: receive multiple video streams from the content source; generate a synchronization timestamp (STS) that is applicable to each of the multiple video streams; and provide the multiple video streams to multiple display panels of the display device, respectively, in accordance with the STS, wherein a same STS is used for each of the multiple video streams.

In one example of the display device, the display device is one in a group of display devices that receive video streams from the content source, wherein the display device receives a video stream over the transport topology that is independent of transport topologies for other display devices in the group of display devices.

In one example of the display device, the content source and the display panel operate in accordance with a Transport Agnostic Display (TAD) protocol that defines display stream transmissions between the content source and the display panel, wherein the TAD protocol enables managing interframe timings between the content source and the display panel.

In one example of the display device, the transport topology includes one of: a legacy wired transport for video streaming, a legacy wireless transport or a non-traditional transport for video, wherein the legacy wired transport includes Universal Serial Bus (USB), the legacy wireless transport includes Institute of Electrical and Electronics Engineers (IEEE) 802.11, and the non-traditional transport includes Ethernet.

In one example of the display device, the earliest time is defined in units of local time, wherein local time identifies a common time base between the content source and the display panel, wherein the local time is derived from an operating system time.

In one example of the display device, the display screen is a region based display screen that includes a plurality of display panel regions, wherein each display panel region refreshes at the PTS or at a synchronization timestamp (STS) or at a fixed delta time from the PTS or the STS, wherein each display panel region is associated with a set of coordinates.

In one example of the display device, the plurality of display panel regions include at least two display panel regions.

In one example of the display device, the plurality of display panel regions comprises a plurality of rectangular shapes.

In one example of the display device, the plurality of rectangular shapes have a long side disposed in a vertical orientation on the display panel region.

In one example of the display device, the plurality of rectangular shapes have a long side disposed in a horizontal orientation on the display panel region.

In one example of the display device, each display panel region refreshes at the PTS or at the STS or at the fixed delta time from the PTS or the STS in accordance with a timing order, wherein the timing order of a display panel region refresh is one of: a top to bottom time order, a bottom to top time order, a left to right time order or a right to left time order.

In one example there is provided a content display system, comprising: a content source device; a display device comprising at least one display screen operable to show at least one display panel; and a controller, comprising logic to: receive a content frame from the content source device over a transport topology; receive a presentation timestamp (PTS) associated with the content frame, wherein the PTS indicates an earliest time at which the content frame is to be displayed at the display device; and provide the content frame for display on the display panel at a subsequent panel refresh opportunity in accordance with the PTS.

In one example of the content display system, the display device is one in a group of display devices that receive video streams from the content source device, wherein the display device receives a video stream over the transport topology that is independent of transport topologies for other display devices in the group of display devices.

In one example of the content display system, the content source device and the display panel operate in accordance with a Transport Agnostic Display (TAD) protocol that defines display stream transmissions between the content source device and the display panel, wherein the TAD protocol enables managing inter-frame timings between the content source device and the display panel.

In one example of the content display system, the transport topology includes one of: a legacy wired transport for video streaming, a legacy wireless transport or a non-traditional transport for video, wherein the legacy wired transport includes Universal Serial Bus (USB), the legacy wireless transport includes Institute of Electrical and Electronics Engineers (IEEE) 802.11, and the non-traditional transport includes Ethernet.

In one example of the content display system, the display screen is a region based display screen that includes a plurality of display panel regions that include at least two display panel regions, wherein each display panel region refreshes at the PTS or at a synchronization timestamp (STS) or at a fixed delta time from the PTS or the STS, wherein each display panel region is associated with a set of coordinates.

In one example of the content display system, the display device comprising multiple display screens operable to each show multiple display panels.

In one example, there is provided a method for providing content frames for display on a display panel of a display device, the method comprising: receiving, at a controller of a display device, a content frame from a content source over a transport topology; receiving, at the controller, a presentation timestamp (PTS) associated with the content frame, wherein the PTS indicates an earliest time at which the content frame is to be displayed at the display device; and providing, from the controller, the content frame for display on the display panel of the display device at a subsequent panel refresh opportunity in accordance with the PTS.

In one example of the method for providing content frames for display on the display panel of the display device, the method further comprises: receiving the content frame from the content source in accordance with a content refresh rate; and providing the content frame for display on the display panel in accordance with a panel refresh rate, wherein the content refresh rate and the panel refresh rate are expressed in Hertz (Hz).

In one example of the method for providing content frames for display on the display panel of the display device, the method further comprises: providing a last content frame from a local buffer for replay on the display panel at a following panel refresh opportunity when there is no new content frame received from the content source.

In one example of the method for providing content frames for display on the display panel of the display device, the method further comprises: generating a synchronization timestamp (STS) for the content frame, wherein the STS is based on units of local time; adjusting a panel refresh rate of the display panel to align with the STS; and providing the content frame for display on the display panel at the STS, wherein the STS is equal to the PTS associated with the content frame or the STS occurs at the subsequent panel refresh opportunity after the PTS.

In one example of the method for providing content frames for display on the display panel of the display device, the method further comprises: generating the STS in response to a configuration received from the content source, wherein the controller generates the STS for every content frame until a reconfiguration is received from the content source to stop generating the STS.

In one example of the method for providing content frames for display on the display panel of the display device, the method further comprises: providing a last content frame from a local buffer for replay on the display panel at a next STS when there is no new content frame received from the content source.

In one example of the method for providing content frames for display on the display panel of the display device, the method further comprises: receiving multiple video streams from the content source; generating a synchronization timestamp (STS) that is applicable to each of the multiple video streams; and providing the multiple video streams to multiple display panels of the display device, respectively, in accordance with the STS, wherein a same STS is used for each of the multiple video streams.

In one example of the method for providing content frames for display on the display panel of the display device, the content source and the display panel operate in accordance with a Transport Agnostic Display (TAD) protocol that defines display stream transmissions between the content source and the display panel, wherein the TAD protocol enables managing inter-frame timings between the content source and the display panel.

In one example there is provided a method for making a display device operable to provide content frames for display on a display panel of the display device, the method comprising: providing one or more display screens operable to show one or more display panels; communicatively coupling a controller to the one or more display panels; and configuring the controller with logic to: receive a content frame from a content source over a transport topology; receive a presentation timestamp (PTS) associated with the content frame, wherein the PTS indicates an earliest time at which the content frame is to be displayed at the display device; and provide the content frame for display on the one or more display panels at a subsequent panel refresh opportunity in accordance with the PTS.

In one example of the method for making the display device operable to provide content frames for display on the display panel of the display device, the display device is one in a group of display devices that receive video streams from the content source, wherein the display device receives a video stream over the transport topology that is independent of transport topologies for other display devices in the group of display devices.

In one example of the method for making the display device operable to provide content frames for display on the display panel of the display device, the content source and the one or more display panels operate in accordance with a Transport Agnostic Display (TAD) protocol that defines display stream transmissions between the content source and the one or more display panels, wherein the TAD protocol enables managing inter-frame timings between the content source and the one or more display panels.

In one example of the method for making the display device operable to provide content frames for display on the display panel of the display device, the one or more display screens are region based display screens that includes a plurality of display panel regions that includes at least two display panel regions, wherein each display panel region refreshes at the PTS or at a synchronization timestamp (STS) or at a fixed delta time from the PTS or the STS, wherein each display panel region is associated with a set of coordinates.

In one example of the method for making the display device operable to provide content frames for display on the display panel of the display device, the plurality of display panel regions comprises a plurality of rectangular shapes.

In one example of the method for making the display device operable to provide content frames for display on the display panel of the display device: the plurality of rectangular shapes have a long side disposed in a vertical orientation on the display panel region; or the plurality of rectangular shapes have a long side disposed in a horizontal orientation on the display panel region.

In one example of the method for making the display device operable to provide content frames for display on the display panel of the display device, each display panel region refreshes at the PTS or at the STS or at the fixed delta time from the PTS or the STS in accordance with a timing order, wherein the timing order of a display panel region refresh is one of: a top to bottom time order, a bottom to top time order, a left to right time order or a right to left time order.

In one example there is provided a controller configured to control at least one display screen operable to show at least one display panel, the controller comprising logic to: receive a content frame from a content source over a transport topology; receive a presentation timestamp (PTS) associated with the content frame, wherein the PTS indicates an earliest time at which the content frame is to be displayed at the display screen; and provide the content frame for display on the display panel at a subsequent panel refresh opportunity in accordance with the PTS.

In one example of the controller, the controller further comprises logic to: receive the content frame from the content source in accordance with a content refresh rate; and provide the content frame for display on the display panel in accordance with a panel refresh rate, wherein the content refresh rate and the panel refresh rate are expressed in Hertz (Hz).

In one example of the controller, the controller further comprises logic to: provide a last content frame from a local buffer for replay on the display panel at a following panel refresh opportunity when there is no new content frame received from the content source.

In one example of the controller, the controller further comprises logic to: generate a synchronization timestamp (STS) for the content frame, wherein the STS is based on units of local time; adjust a panel refresh rate of the display panel to align with the STS; and provide the content frame for display on the display panel at the STS, wherein the STS is equal to the PTS associated with the content frame or the STS occurs at the subsequent panel refresh opportunity after the PTS.

In one example of the controller, the controller further comprises logic to: generate the STS in response to a configuration received from the content source, wherein the controller generates the STS for every content frame until a reconfiguration is received from the content source to stop generating the STS.

In one example of the controller, the controller further comprises logic to: provide a last content frame from a local buffer for replay on the display panel at a next STS when there is no new content frame received from the content source.

In one example of the controller, the controller further comprises logic to: receive multiple video streams from the content source; generate a synchronization timestamp (STS) that is applicable to each of the multiple video streams; and provide the multiple video streams to multiple display panels of the display screen, respectively, in accordance with the STS, wherein a same STS is used for each of the multiple video streams.

While the forgoing examples are illustrative of the principles of technology embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A display device, comprising:
   at least one display screen operable to show at least one display panel; and
   a controller, comprising logic to:
   receive a content frame from a content source over a transport topology;
   receive a presentation timestamp (PTS) associated with the content frame, said PTS indicating an earliest time at which the content frame is to be displayed at the display device; and
   provide the content frame for display on the display panel at a panel refresh opportunity subsequent to receipt of the content frame and PTS in accordance with the PTS;
   wherein either:
   the earliest time is defined in units of local time, wherein local time identifies a common time base between the content source and the display panel, wherein the local time is derived from an operating system time; or
   the controller further comprises logic to:
   generate a synchronization timestamp (STS) based on units of local time for the content frame;

adjust a panel refresh rate of the display panel to align with the STS; and provide the content frame for display on the display panel at the STS, wherein the STS is equal to the PTS associated with the content frame or the STS occurs at a subsequent panel refresh opportunity after the PTS.

2. The display device of claim 1, wherein the controller comprises logic to:
receive the content frame from the content source in accordance with a content refresh rate; and
provide the content frame for display on the display panel in accordance with a panel refresh rate,
wherein the content refresh rate and the panel refresh rate are expressed in Hertz (Hz).

3. The display device of claim 2, wherein:
the PTS serves to decouple the content refresh rate from the panel refresh rate, such that the content refresh rate is different from the panel refresh rate; and
the subsequent panel refresh opportunity occurs at the PTS or after the PTS.

4. The display device of claim 1, wherein the controller comprises logic to: provide a last content frame from a local buffer for replay on the display panel at a following panel refresh opportunity when there is no new content frame received from the content source.

5. The display device of claim 1, wherein the controller comprises logic to: generate the STS in response to a configuration received from the content source, wherein the controller generates the STS for every content frame until a reconfiguration is received from the content source to stop generating the STS.

6. The display device of claim 1, wherein the controller comprises logic to: provide a last content frame from a local buffer for replay on the display panel at a next STS when there is no new content frame received from the content source.

7. The display device of claim 1, wherein the controller comprises logic to:
receive multiple video streams from the content source;
generate a synchronization timestamp (STS) that is applicable to each of the multiple video streams; and
provide the multiple video streams to multiple display panels of the display device, respectively, in accordance with the STS, wherein a same STS is used for each of the multiple video streams.

8. The display device of claim 1, wherein the display device is one in a group of display devices that receive video streams from the content source, wherein the display device receives a video stream over the transport topology that is independent of transport topologies for other display devices in the group of display devices.

9. The display device of claim 1, wherein the content source and the display panel operate in accordance with a Transport Agnostic Display (TAD) protocol that defines display stream transmissions between the content source and the display panel, wherein the TAD protocol enables managing inter-frame timings between the content source and the display panel.

10. The display device of claim 1, wherein the transport topology includes one of: a legacy wired transport for video streaming, a legacy wireless transport or a non-traditional transport for video, wherein the legacy wired transport includes Universal Serial Bus (USB), the legacy wireless transport includes Institute of Electrical and Electronics Engineers (IEEE) 802.11, and the non-traditional transport includes Ethernet.

11. The display device of claim 1, wherein the display screen is a region based display screen that includes a plurality of display panel regions, wherein each display panel region refreshes at the PTS or at a synchronization timestamp (STS) or at a fixed delta time from the PTS or the STS, wherein each display panel region is associated with a set of coordinates.

12. The display device of claim 11, wherein the plurality of display panel regions include at least two display panel regions.

13. The display device of claim 11, wherein the plurality of display panel regions comprises a plurality of rectangular shapes.

14. The display device of claim 13, wherein the plurality of rectangular shapes have a long side disposed in a vertical orientation on the display panel region.

15. The display device of claim 13, wherein the plurality of rectangular shapes have a long side disposed in a horizontal orientation on the display panel region.

16. The display device of claim 11, wherein each display panel region refreshes at the PTS or at the STS or at the fixed delta time from the PTS or the STS in accordance with a timing order, wherein the timing order of a display panel region refresh is one of: a top to bottom time order, a bottom to top time order, a left to right time order or a right to left time order.

17. A content display system, comprising:
a content source device;
a display device comprising at least one display screen operable to show at least one display panel; and
a controller, comprising logic to:
receive a content frame from the content source device over a transport topology;
receive a presentation timestamp (PTS) associated with the content frame, wherein the PTS indicates an earliest time at which the content frame is to be displayed at the display device; and
provide the content frame for display on the display panel at a panel refresh opportunity subsequent to receipt of the content frame and PTS in accordance with the PTS;
wherein either:
the earliest time is defined in units of local time, wherein local time identifies a common time base between the content source and the display panel, wherein the local time is derived from an operating system time; or
the controller further comprising logic to:
generate a synchronization timestamp (STS) for the content frame, wherein the STS is based on units of local time;
adjust a panel refresh rate of the display panel to align with the STS; and
provide the content frame for display on the display panel at the STS, wherein the STS is equal to the PTS associated with the content frame or the STS occurs at a subsequent panel refresh opportunity after the PTS.

18. The content display system of claim 17, wherein the display device is one in a group of display devices that receive video streams from the content source device, wherein the display device receives a video stream over the transport topology that is independent of transport topologies for other display devices in the group of display devices.

19. The content display system of claim 17, wherein the content source device and the display panel operate in accordance with a Transport Agnostic Display (TAD) protocol that defines display stream transmissions between the content source device and the display panel, wherein the TAD protocol enables managing inter-frame timings between the content source device and the display panel.

20. The content display system of claim 17, wherein the display screen is a region based display screen that includes a plurality of display panel regions that include at least two display panel regions, wherein each display panel region refreshes at the PTS or at a synchronization timestamp (STS) or at a fixed delta time from the PTS or the STS, wherein each display panel region is associated with a set of coordinates.

21. The content display system of claim 17, wherein the display device comprising multiple display screens operable to each show multiple display panels.

22. A controller configured to control at least one display screen operable to show at least one display panel, the controller comprising logic to:
 receive a content frame from a content source over a transport topology;
 receive a presentation timestamp (PTS) associated with the content frame, wherein the PTS indicates an earliest time at which the content frame is to be displayed at the display screen; and
 provide the content frame for display on the display panel at a panel refresh opportunity subsequent to receipt of the content frame and PTS in accordance with the PTS;
 wherein either:
  the earliest time is defined in units of local time, wherein local time identifies a common time base between the content source and the display panel, wherein the local time is derived from an operating system time; or
  the controller further comprising logic to:
  generate a synchronization timestamp (STS) for the content frame, wherein the STS is based on units of local time;
  adjust a panel refresh rate of the display panel to align with the STS; and
  provide the content frame for display on the display panel at the STS, wherein the STS is equal to the PTS associated with the content frame or the STS occurs at a subsequent panel refresh opportunity after the PTS.

23. The controller of claim 22, further comprising logic to:
 receive the content frame from the content source in accordance with a content refresh rate; and
 provide the content frame for display on the display panel in accordance with a panel refresh rate,
 wherein the content refresh rate and the panel refresh rate are expressed in Hertz (Hz).

24. The controller of claim 22, further comprising logic to provide a last content frame from a local buffer for replay on the display panel at a following panel refresh opportunity when there is no new content frame received from the content source.

25. The controller of claim 22, further comprising logic to generate the STS in response to a configuration received from the content source, wherein the controller generates the STS for every content frame until a reconfiguration is received from the content source to stop generating the STS.

26. The controller of claim 22, further comprising logic to provide a last content frame from a local buffer for replay on the display panel at a next STS when there is no new content frame received from the content source.

27. The controller of claim 22, further comprising logic to:
 receive multiple video streams from the content source;
 generate a synchronization timestamp (STS) that is applicable to each of the multiple video streams; and
 provide the multiple video streams to multiple display panels of the display screen, respectively, in accordance with the STS, wherein a same STS is used for each of the multiple video streams.

* * * * *